April 7, 1959
F. L. TYE
2,881,124
INSERTS FOR MEMBRANE SPACERS
Filed Oct. 26, 1956
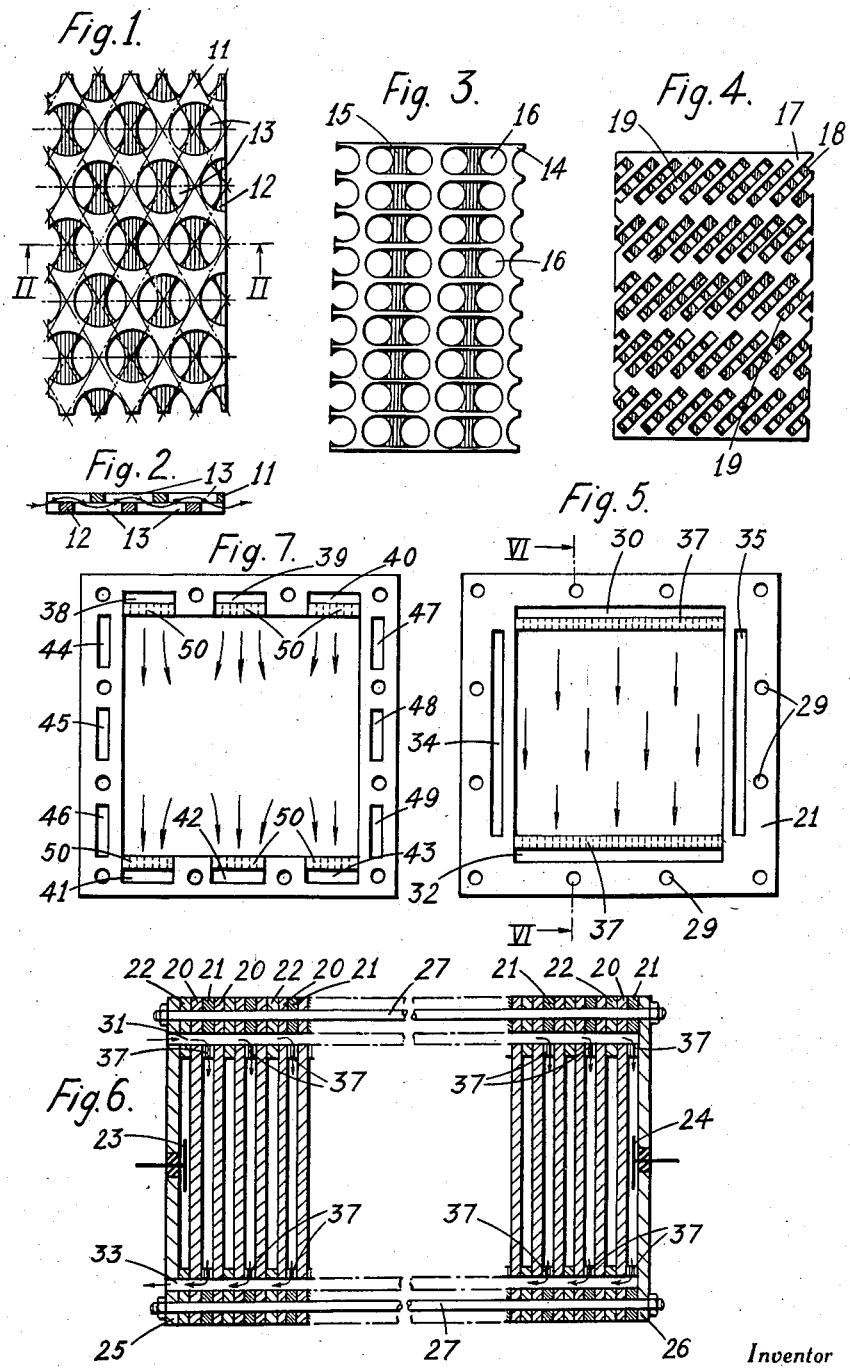
Inventor
Frank Laurence Tye
By
Bailey, Stephens + Huettig
Attorneys

United States Patent Office 2,881,124
Patented Apr. 7, 1959

2,881,124

INSERTS FOR MEMBRANE SPACERS

Frank Laurence Tye, London, England, assignor to The Permutit Company Limited, London, England, a British company Application October 26, 1956, Serial No. 618,617

Claims priority, application Great Britain March 2, 1956

4 Claims. (Cl. 204—301)

This invention relates to electrolytic cells for carrying out processes of electrodialysis the cells being made up of a series of compartments between two electrodes, the compartments being separated by ion-exchange membranes held apart round their edges by spacers in the shape of open frames. The introduction of liquid into and removal of it from each compartment is a matter of difficulty as the distance between adjacent membranes is preferably small and the spacers therefore very thin. Most conveniently conduits are formed through the cell by cooperating holes in the membranes and spacers, passages in the spacers connecting the conduits to the compartments. Now most ion-exchange membranes are flexible, being made of granules or particles of an ion-exchange resin supported in a plastic matrix and there is a tendency for these membranes to bulge and bow into a passage where they cross a passage under the pressure applied to compress the membranes and spacers and make the cell liquid-tight.

It is an object of this invention to provide an improved construction of electrodialysis cell.

It is a further object of the invention to provide an insert for placing in the passages between the holes forming part of the conduits and the compartments.

Further objects will appear hereinafter.

In accordance with my invention each passage contains a separate insert which does not substantially interrupt the flow of liquid through the passage and substantially prevents deformation of the membranes into the passages.

The invention will now be described in greater detail with reference to the accompanying drawings which are given by way of example and not of limitation, and in which:

Figure 1 is a plan view of insert;
Figure 2 is a section on the line II—II in Figure 1;
Figures 3 and 4 are plan views of two further inserts;
Figure 5 is a plan view of a spacer having inserts in position;
Figures 6 is a cross-section through a cell made up with spacers of the type shown in Figure 5, the section being taken on a plane corresponding to that shown as VI—VI in Figure 5; and
Figure 7 is a plan view of a further spacer having inserts in position.

Where it has heretofore been necessary to use small holes because of the tendency of the membranes to bow, it is now possible in accordance with this invention to use holes which are rectangular with their long sides parallel with the inside edges of the spacers. This has obvious advantages compared with small, usually circular, holes where the liquid in each compartment has to fan out from each hole on entering and to be collected again on leaving. Rectangular holes can extend right along the sides of each compartment, the liquid then flowing as a sheet, and experiencing very little drop in pressure in passing through the insert as compared with smaller inserts. Further the liquid path through each compartment is shorter. All these advantages combine to give a more efficient use of the membrane area, a given process therefore requiring a smaller cell or a lower power consumption.

In the method of construction illustrated in Figures 1 to 4 two or more sheets are fixed face to face, each sheet having holes of such size, shape and position that when fixed together each hole in one sheet overlaps at least two holes in the adjacent sheet or sheets, the overlapping holes forming a sinuous channel from one edge of the insert to the other. Referring first to Figures 1 and 2 the insert is made up of two similar sheets 11 and 12 having circular holes 13 with their centres on an equilateral triangular lattice system (shown dotted), the centres being less than four times the radius of the holes apart. The two sheets are fixed together so that each hole in one sheet overlaps two holes in the other sheet. It is preferred that the centres of adjacent holes are only just more than twice the radius apart. In this way the overlap between the holes of the two sheets is as large as possible. The sinuous path through the insert is shown by the arrow in Figure 2.

In the insert shown in Figure 3 two sheets 14 and 15 have elongated holes 16, each hole in one sheet connecting two holes in the other sheet.

In another construction the holes in the sheets are slots at an angle to the direction of flow of liquid through the insert, the slots in one sheet being at an angle to the slots in an adjacent sheet. For example, as shown in Figure 4, there are two sheets 17 and 18 having slots 19. The slots in one sheet are at right-angles to the slots in the other sheet.

Although it is more convenient for the sheets to be similar, this is not necessary. For example, a circular hole in one sheet can overlap four circular holes in another sheet, while a hole in this latter sheet overlaps only two holes in the first sheet.

In an alternative method of construction two or more flat sheets of identical dimensions with the plan of the passage are separated and supported the one by the other by four pieces of material equal to the length of the passage arranged between the sheets so as to form a number of channels running parallel with one another.

Such a method of construction is described in co-pending application Serial No. 618,618 of T. Roger E. Kressman, myself and Hugh R. Bott.

Whatever the method of construction the inserts should be made of material unaffected by the liquids in the compartments and should also be electrically insulating. The inserts are preferably made of rigid, that is unplasticised, polyvinyl chloride. They may also be made, for example, of polystyrene or polyethylene or of metal covered with any of these plastics.

A filter medium can be incorporated in an insert to prevent suspended matter entering the compartments or to prevent any granular ion-exchange material in the compartments from being carried out in the flowing liquid. The filter medium can be a piece of gauze mounted in the channels formed through the inserts.

The inserts may be built up by gluing or welding together the component parts, or by any suitable technique used in shaping plastics, for example, by extrusion.

The insert may either be laid into the passages or joined to the membranes or the spacer, for example, by gluing or welding.

Referring now to Figures 5 and 6 the cell is made up of a series of plane ion-exchange membranes 20 separated alternately by the spacers 21 shown in Figure 5 and by spacers 22 of identical shape which have been turned through 90°, and has an anode 23 and a cathode 24 between end-plates 25 and 26. The cell is held together by rods 27 passing through holes 29 in the membranes, spacers and end-plates. The spacers 21 and 22 and also the membranes 20 have four rectangular holes round their edges, these holes, when the spacers and membranes are assembled, forming four conduits through the cell. In the spacer 21 which defines one set of the alternate compartments in the cell, the hole numbered 30 forms part of the conduit 31 leading a liquid to these compartments. The hole numbered 32 forms part of the conduit 33 removing the liquid from the compartments, the flow of liquid through the compartments being indicated by arrows. The holes numbered 34 and 35 form parts of the other two conduits which lead the liquid to and remove it from the other set of alternate compartments.

The holes 30 and 32 have passages connecting them to the compartments defined by the spacers. Each passage has in it an insert 37, which can take the shape of any of those described above.

In Figure 7 there are twelve holes round the edge of the spacer. The conduits of which the holes 38 to 40 form part lead the liquid to and the conduits of which the holes 41 to 43 form part remove it from one set of the alternate compartments and the conduits of which the holes 44 to 49 form part lead the liquid to and remove it from the other set of the alternate compartments. The passages connecting the holes 38 to 43 to the compartments defined by the spacers have inserts 50. These spacers are assembled with membranes to form a cell in a similar manner to that shown in Figure 6.

It will be apparent that other constructions of inserts and cells can be used within the scope of the present invention.

I claim:

1. An electrodialysis cell comprising two electrodes, a series of ion-exchange membranes between two electrodes dividing the space therebetween into compartments, spacers around the edges of the membranes in the shape of open frames separating the membranes, said membranes and spacers each having successively communicating holes through them cooperating to form conduits through the cell at right angles to the membranes, some of said holes extending to the inside edges of said spacers to form passages through them substantially rectangular in plan connecting said conduits to said compartments, and a rectangular insert filling each passage, said insert being substantially equal in thickness to the spacer and supporting the adjacent membranes across the width of the passage while preventing them from being deformed into the passage, said insert comprising at least two sheets, said sheets having holes therein so positioned and dimensioned that each hole in either sheet is capable of overlapping at least two holes in the other sheet in a certain relative position of the sheets to one another, said sheets being positioned in planes parallel to the planes of the membranes and being fixed face to face in such relative position to one another, whereby to form a tortuous passage from one edge of the insert to the other.

2. In a cell as claimed in claim 1, said insert being formed of rigid polyvinyl chloride.

3. In a cell as claimed in claim 1, said insert including a filtering medium.

4. In a cell as claimed in claim 1, said holes having their centers on an equilateral triangular lattice system and less than four times the radius of the holes apart.

References Cited in the file of this patent

UNITED STATES PATENTS

| 2,735,812 | Van Hoek | Feb. 21, 1956 |

FOREIGN PATENTS

| 135,819 | Great Britain | Dec. 18, 1919 |
| 619,080 | France | Dec. 27, 1926 |
| 668,618 | Great Britain | Mar. 19, 1952 |